United States Patent
Wang et al.

(10) Patent No.: US 7,414,226 B2
(45) Date of Patent: Aug. 19, 2008

(54) MOVABLE HEATING METHOD AND SYSTEM HAVING FIXED HEATING SOURCE FOR BRAZING STATOR BARS

(75) Inventors: Yu Wang, Clifton Park, NY (US); David Robert Schumacher, Scotia, NY (US); James Michael Fogarty, Schenectady, NY (US); Alan Michael Iversen, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 541 days.

(21) Appl. No.: 11/195,590

(22) Filed: Aug. 3, 2005

(65) Prior Publication Data

US 2006/0108357 A1  May 25, 2006

Related U.S. Application Data

(60) Provisional application No. 60/628,931, filed on Nov. 19, 2004.

(51) Int. Cl.
*F27D 7/00* (2006.01)
(52) U.S. Cl. .......... 219/615; 219/600; 219/601; 219/602; 219/603; 219/85.1; 228/234.1
(58) Field of Classification Search ......... 219/600–677, 219/85.1; 228/234.1
See application file for complete search history.

(56) References Cited

U.S. PATENT DOCUMENTS

| | | | | |
|---|---|---|---|---|
| 2,657,298 A | * | 10/1953 | Andrus | 219/603 |
| 2,851,582 A | * | 9/1958 | Meyers et al. | 219/85.17 |
| 7,199,338 B2 | * | 4/2007 | Breznak et al. | 219/615 |
| 7,219,827 B2 | * | 5/2007 | Breznak et al. | 228/245 |
| 2002/0079773 A1 | * | 6/2002 | Butman et al. | 310/201 |

FOREIGN PATENT DOCUMENTS

JP  55114461 A  *  9/1980

* cited by examiner

*Primary Examiner*—Jerry Lorengo
*Assistant Examiner*—Erin P Barry
(74) *Attorney, Agent, or Firm*—Nixon & Vanderhye P.C.

(57) ABSTRACT

A method to heat a stator bar and clip assembly in a brazing chamber including: placing the stator bar and clip assembly in the brazing chamber, wherein the assembly is seated in a heating coil; positioning a conductive mass between a press and the stator bar and clip; applying the press to the assembly while the assembly is seated in the coil; heating the stator bar and clip by applying energy to the coil; brazing the stator bar to the clip with the heat from the coil, and removing the press and cooling the brazed clip.

15 Claims, 6 Drawing Sheets

MOVABLE HEATING METHOD AND SYSTEM HAVING FIXED HEATING SOURCE FOR BRAZING STATOR BARS

RELATED APPLICATION

This application claims the benefit of U.S. Provisional Application Ser. No. 60/628,931, entitled "Generator Stator Bar Handling, Brazing, and Processing" and filed in the U.S. Patent and Trademark on Nov. 19, 2004, the entirety of this provisional application is incorporated by reference herein.

BACKGROUND OF THE INVENTION

The present invention relates to brazing the ends of large stator bars that are used in power and industrial generators, positioning these bars in a brazing station, and fitting header clips to the bars during assembly.

Stator bars are typically large, long and heavy, e.g., 35 feet long and hundreds of pounds (lbs.). The bars are generally straight and extend the length of a stator. When seated in a stator, the straight sections of the stator bars form a cylindrical array around a rotor. The ends of the stator bars extend axially from opposite ends of the stator. The end portion of the stator bars extend from the stator and are curved to form end turns. The ends of stator bars are connected through copper or stainless steel fittings and water-cooled connections to form continuous hydraulic winding circuits.

Each water-cooled stator bar comprises an array of small rectangular solid and hollow copper strands. The array of copper strands in each bar are generally arranged in a rectangular bundle. The hollow strands each have an internal duct for conducting coolant through the bar. The ends of the bars are each connected to a hydraulic header clip.

The hydraulic header clip serves as an electrical and a cooling flow connection for the armature winding bar. The hydraulic header clip is a hollow connector that includes an enclosed chamber for ingress or egress of a cooling liquid, typically deionized water. At one open end, the clip encloses the ends of the copper strands of the armature winding bar. A braze alloy bonds the end sections of the strands to each other and to the hydraulic header clip. The ends of the solid and hollow strands are brazed to a hydraulic header clip fitted to the end of the stator bar.

The stator bar end and clip assembly must be heated to melt the braze alloy and braze the assembly together. A system and method is needed for applying heat to the clip and stator bar end assembly during the brazing process.

BRIEF DESCRIPTION OF THE INVENTION

A method has been developed to heat a metal assembly in a brazing chamber comprising: placing the assembly in the brazing chamber, wherein the assembly is seated in a heating coil; positioning a conductive mass between a press and the assembly; applying the press to the assembly while the assembly is seated in the coil; heating the assembly and the mass by applying energy to the coil; brazing the assembly with the heat from the coil, and removing the press and cooling the brazed assembly. The assembly may include a stator bar end, e.g., stator strands, and a clip.

The method may further comprise heating coil includes a U-shaped section and the stator bar end seats in the U-shaped section, wherein the conductive mass seats in the U-shaped section and substantially fills an area defined by an entrance to the U-shaped section. Further, the conductive mass seats in the coil when abutting the stator bar and clip.

The method may also be heating a stator bar and clip assembly in a brazing chamber comprising: placing the stator bar and clip assembly in the brazing chamber, wherein the assembly is seated in a U-shaped section of the heating coil; seating a heating mass in the U-shaped section between a ram and the assembly; extending the ram to press the heating mass against the assembly in the coil, wherein the mass fits into the U-shaped section; heating the stator bar and clip by applying energy to the coil; brazing the stator bar to the clip with the heat from the coil, and removing the press and cooling the brazed clip.

A heating system has been developed for brazing a stator bar to a clip comprising: a heating coil having a seat to receive the stator bar and clip; a heating mass adapted to fit into the seat of the coil, and an extendible press applying the mass to the stator bar or clip. The seat may be a U-shaped section of the coil and the mass substantially fills an area defined by an entrance to the seat of the coil.

DETAILED DESCRIPTION OF THE INVENTION

Figure 1:
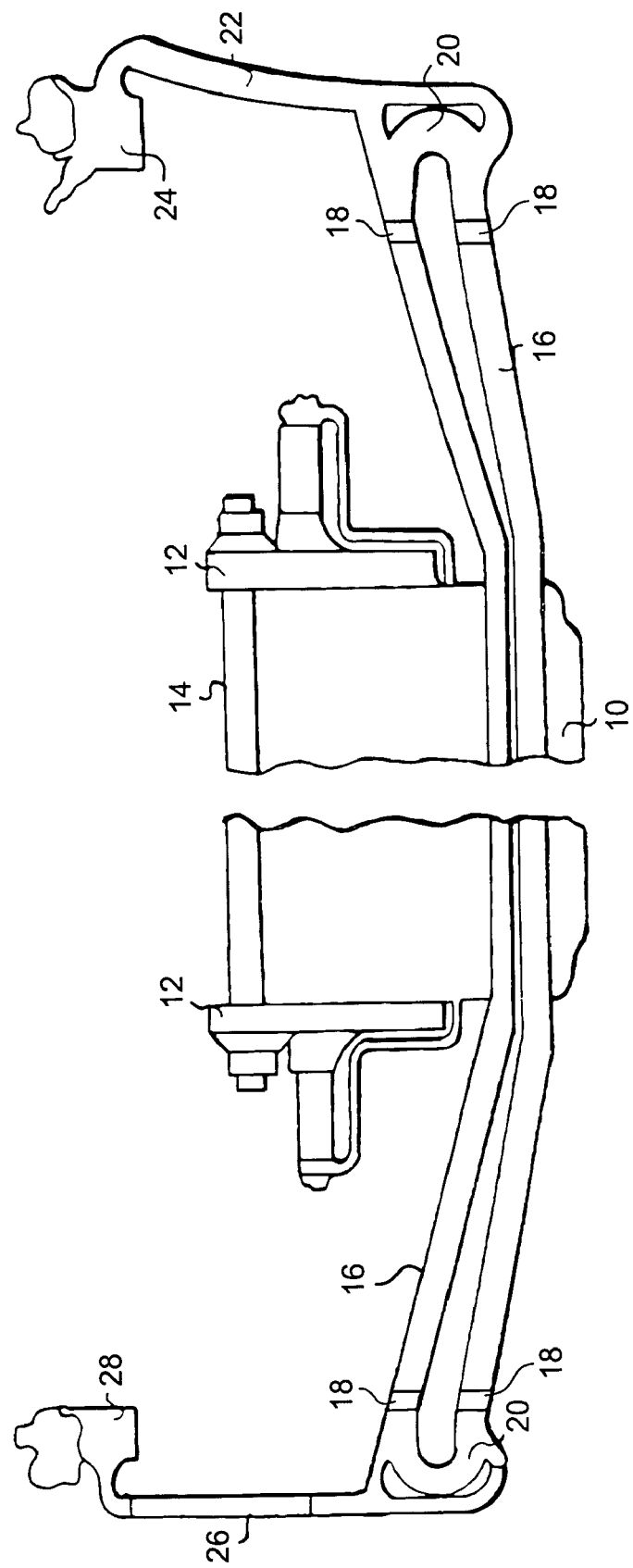
FIG. 1 is a schematic illustration of a liquid-cooled stator winding arrangement illustrating the stator, stator bars and hydraulic header clips coupled to inlet and outlet coolant headers.

FIG. 1 illustrates a liquid-cooled stator bar arrangement for a stator in a typical liquid-cooled generator. A stator core 10 has stator core flanges 12 and core ribs 14. Stator bars 16 (also referred to as armature winding bars) pass through radially extending slots in the stator core and are capped at opposite ends by hydraulic header clips 18 fitted to the ends of the bars. Copper or stainless steel fittings 20 connect adjacent ends of the stator bar pairs to form the complete armature coil. Inlet hoses 22 connect an inlet clip 18 to an inlet coolant header 24. Outlet hoses 26 connect an outlet clip 18 to an outlet coolant header 28. Each stator bar forms a half an armature coil. A pair of stator bars linked at their opposite ends form a complete armature coil.

Figure 2:
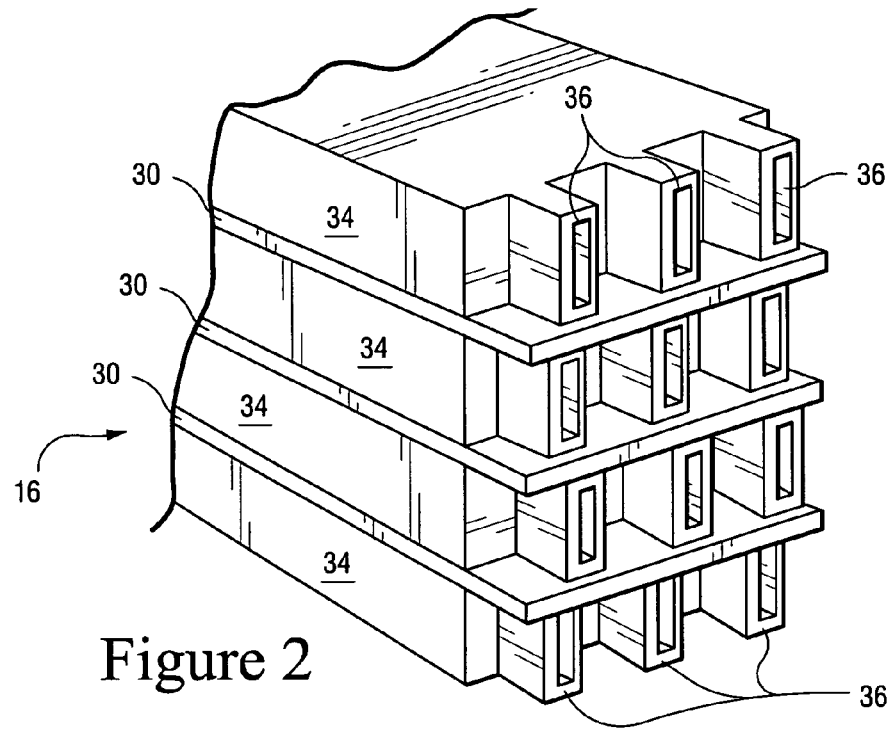
FIG. 2 is a perspective view of the end of an armature winding bar showing the tiered rows of hollow and solid strands, and interleaving sheets of braze material.
Figure 3:
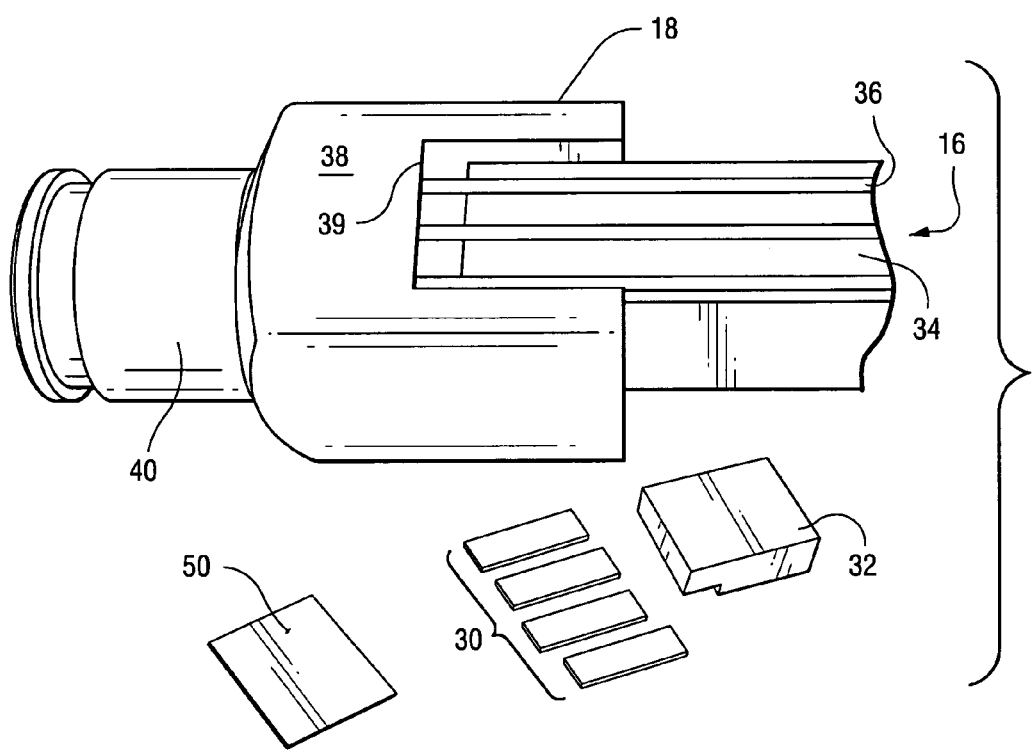
FIG. 3 is a perspective exploded view of the end of an armature winding bar inserted into a hydraulic header clip, with braze material and a clip cover shown to the side of the clip.

FIG. 2 is a perspective end view of an stator bar 16 without a hydraulic header clip. The bar is a rectangular array of solid 34 and hollow 36 copper strands. FIG. 3 is a perspective view of the end of an armature winding bar 16 inserted in a clip 18 with braze strips 30 and a braze sheet 50. A clip cover 32 is shown to the side of the clip 18. In FIG. 2, the braze strips 30 are interleaved between tiered rows of solid the copper strands 34 and rows of hollow strands 36 of the bar 16. Just prior to brazing and at the end of the stator bar, braze strips are inserted between the strands 34, 36. In addition, the braze sheets 50 and clip 32 are assembled in the clip 18.

As shown in FIG. 2, the pre-braze positioned braze alloy strips extend beyond the ends of the short solid strands. The height of the alloy pre-positioned before brazing is selected so that the braze alloy will entirely melt during the braze process and not flow into the open ends of the extended hollow strands.

The hydraulic header clip 18 (also referred to as a stator bar clip) is formed of an electrically conductive material, such as copper. The clip 18 is hollow and includes a rectangular collar 38 that slides over the outer side surfaces of the end of the armature winding bar 16. A rectangular slot 39 in the collar receives the end of the armature winding bar and interleaved strips 30 of the braze alloy. A clip cover 32 fits into the matching rectangular slot 39 in the side of the collar 38. Sheets 50 of braze alloy are arranged around the inside surface of the collar and surrounding the end of the bar. At the other end of the clip 18 is a cylindrical coupling end 40 that is configured to connect to the coolant circuit.

During brazing, the stator bar is held in a vertical position. When the stator bar is vertical the planer end of the bar is horizontal. An end clip 18 is fitted to the end of the stator bar and braze material 30, 50 is placed between the clip and bar. Melted braze alloy forms a pool over the solid strand ends of the stator bar. The braze alloy material 30, 50 may be a rolled, essentially phosphorous-free, silver based braze alloy. After brazing, the braze alloy forms a braze alloy isolation coating over the end of the armature bar (but not the end of the hollow strands). The isolation layer shields the solid strand ends and the joints from the coolant passage in the clip. The braze alloy also bonds the clip to the strands and the strand ends to each other.

During brazing, the induction heating coil 66 heats the assembly of the clip, strand and braze strips 30 and sheets 50. The heating coil 66 heats the clip and end of the stator bar to braze them together. A heating mass 57 may be placed between the end of the ram 54 and the clip cover 32. The heating mass 57 may be formed a thermally conductive material, such as steel or copper. The heating mass 57 is heated by the heating coil 66 and conducts heat to the clip cover. The heating mass may have an inverted "C" shape in cross-section to fit the end of the ram and fit into the "C" shaped heating coil 66. The heating mass slides between the legs of the heating coil without touching the coil. The heating mass may also have a slot on its front face to receive a lever arm a clamp used to hold the clip to the stator bar while the clip and bar assembly are positioned in the brazing chamber.

The heating mass 57 assists in applying heat to the clip cover 32 during brazing. The heating mass is heated by the coil 66. Heat energy is transferred by conduction from the mass 57 to the clip cover 32. The heating mass abuts directly against the clip cover (or other exposed outer surfaces of the clip and bar assembly) to promote conductive heat transfer to the cover or exposed outer surfaces.

Further, the heating mass seats in the U-shaped coil 66. The C-shaped cross-sectional profile of the heating mass 57 substantially fills the entrance area 67 of the U-shaped seat in the coil. For example, the heating mass may fill at least 75% of the entrance area of the seat in the coil. The sides of the heating mass 57 may be substantially parallel and adjacent to the sides of the heating coil to ensure that the mass is heated by the coil.

Mica may be used for spacers 76 separating the coil from the clip and the heating mass 57 from the ram 54. The mica spacer between the coil and clip may be 0.060 inches. A thermal mass spacer may be used to insulate the shaft of the ram 54 from the heating mass 57.

A heat sink clamp 69 is attached to the stator bar below the heated end of the bar. The heat sink cools the stator bar below the clip. By cooling the bar, liquefied braze is prevented from flowing down between the strands when the vertical bar is in the braze hood.

The braze joint is preferably made with the stator bar in a vertical orientation. The vertical orientation is preferred because it aids alloy retention in the joint and permits pieces of the alloy to be more easily pre-placed on the surface of the assembly inside the hydraulic header clip, thereby providing a source of additional braze alloy and/or filler metal that will melt and flow over the bar 16 end surfaces to create a thicker layer of braze isolation layer over the ends of the solid copper strands of the bar.

Figure 4:
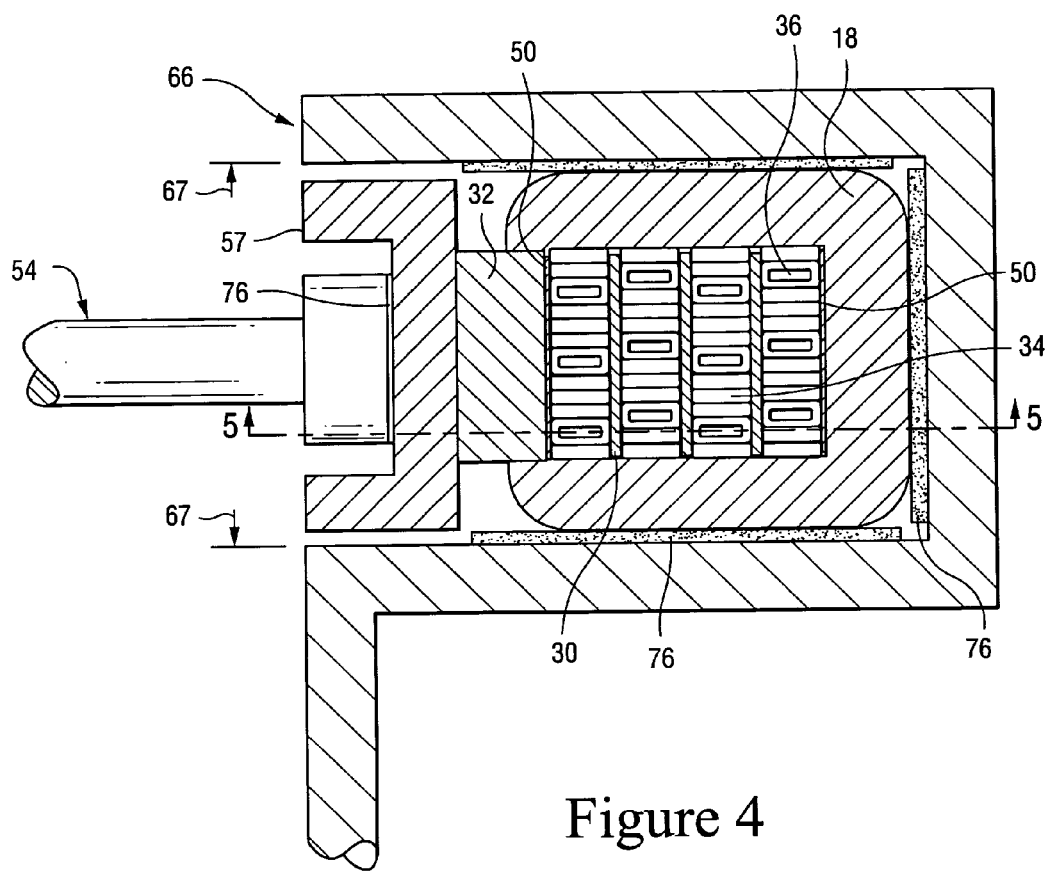
FIG. 4 is an end view of the strands of an armature winding bar within a hydraulic header end clip with a ram clamping the cover to the clip and a heat sink attached to the bar.

FIG. 4 is a cross-sectional end view of the hydraulic header clip 18, the free ends of the solid 34 and hollow 36 strands, a ram 54 pressing the clip cover 34 into the clip and an induction heating coil 66 to heat the assembly of the clip, strand and braze strips 30 and sheets 50. The hydraulic header clip 18 (also referred to as a stator bar clip) is formed of an electrically conductive material, such as copper. The clip 18 is hollow and includes a rectangular collar 38 that slides over the outer side surfaces of the end of the armature winding bar 16. A rectangular slot 39 in the collar receives the end of the armature winding bar and interleaved strips 30 of the braze alloy. The clip cover 32 fits into the matching rectangular slot 39 in the side of the collar 38. At the other end of the clip 18 is a cylindrical coupling end 40 that is configured to connect to the coolant circuit.

Figure 5:
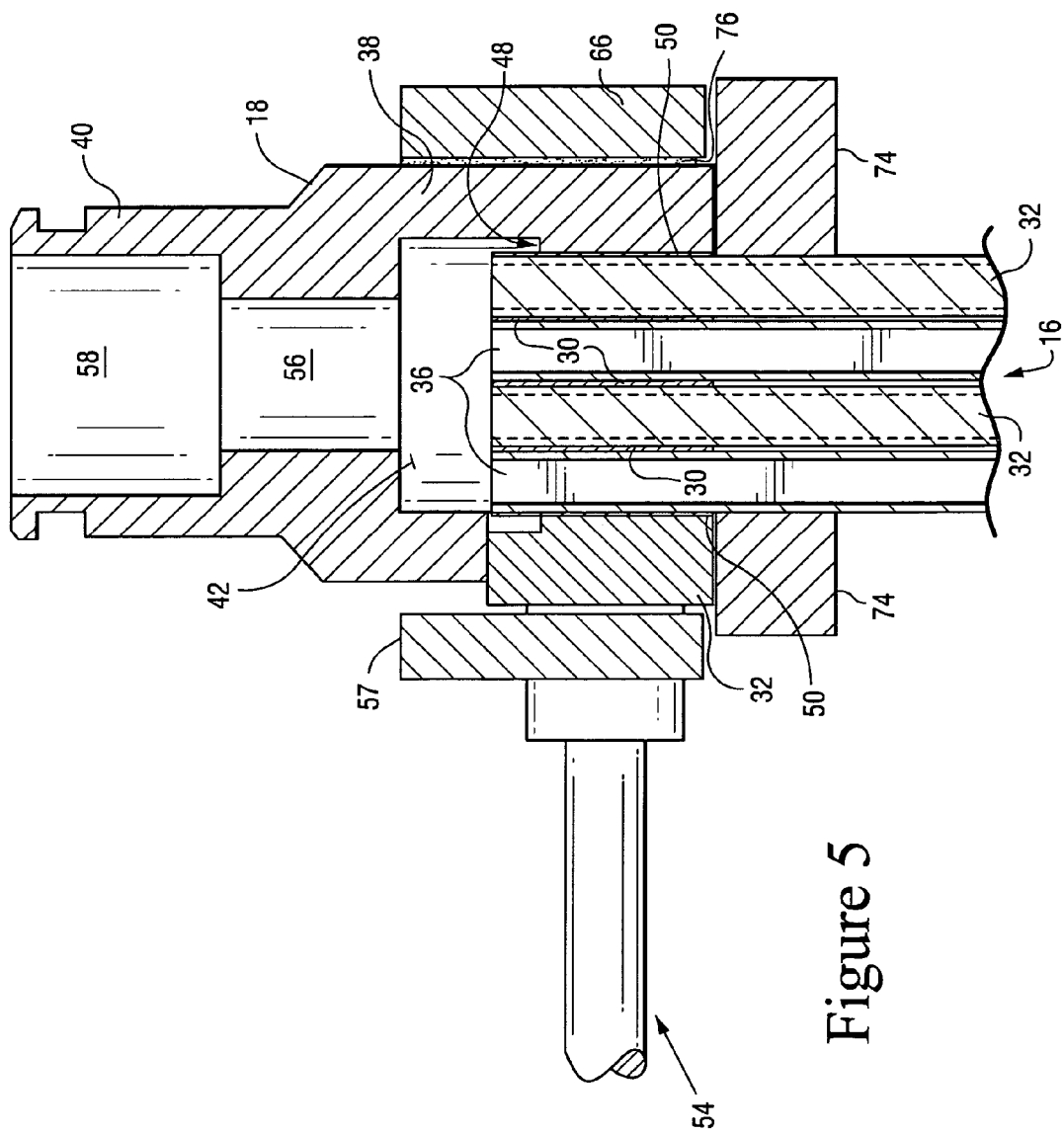
FIG. 5 is a side view of the winding bar, end clip and ram shown in a cross-section taken along line 5-5 in FIG. 4.

FIG. 5 is a cross-sectional side view of a hydraulic header clip 18 receiving an armature winding bar 16 and the ram 54 to press the clip cover 32 into the clip slot 39 during brazing. The solid and hollow copper strands 34, 36 are disposed in a side-by-side and superposed relation one to the other, in a generally rectangular, multi-tier array. The array may be compressed within the hydraulic end fitting or header clip 18 by means of the side cover 32 fitted within a similarly shaped slot 39 of the header clip. Ram 54 presses the clip cover 32 into the collar 38 and compress together the ends of the strands 34, 36 and interleaved braze strips.

The clip and stator bar assembly is seated in an induction heating coil 66. Mica spacers 76 separate the coil from the clip. The mica spacer between the coil and clip may be 0.060 inches and the spacer between the ram and clip cover may be 0.030 inches. A cooled heat sink clamp 74 grasps the bar 16 just below the clip during the brazing process.

Each hydraulic header clip 18 includes an internal manifold chamber 42 within the clip collar 38. The manifold chamber 42 receives the strand ends 34, 36 of the armature bar and provides a conduit for coolant flowing through the clip 18 to enter or be discharged from the hollow strands 36 of the armature bar 16. Within the clip, the manifold chamber 42 is internally open to a necked down internal chamber section 56 and to an expanded sub-chamber 58, which is aligned with the hose coupling 40 and configured to receive coolant flowing into or out of a hose. The external and internal shapes of a clip may vary to suit different armature bar configurations that are present in large liquid cooled turbine generators.

When the bar 16 is brazed to the hydraulic header clip 18, the free ends of the solid copper strands 34 are generally flush with a back wall 48 of the manifold chamber 42. The free ends of the hollow copper strands 36 extend partially into the manifold chamber 42. The ends of the hollow copper strands 36 may extend about 10 to 500 thousands of an inch beyond the ends of solid strands 34 and into the chamber 42.

The differential lengths of the solid and hollow strands may be achieved by any suitable means including the use of a cutting tool to shorten the solid strands. The alloy strips 30 between the tiers of the solid and hollow strands do not generally extend axially beyond the ends of the hollow strands 36 so that liquid braze when liquefied does not plug the open ends of the hollow strands. In addition, filler metal 44 and the braze alloy sheets 50 (FIG. 3) are pre-placed along the interior walls 46 of the clip to surround the enclosed ends of the hollow and solid strands. The filler metal 44 may be a copper-silver alloy that is positioned between the outer strands and the interior of the clip.

At the end of the brazing process, a braze alloy isolation layer 52 extends axially along and between all sides of each of the strands 34, 36 in the array, and also covers the ends (or faying surfaces) of the solid strands 34 while leaving the ends of the hollow strands 36 open and unobstructed for free flow of coolant through the hollow strands.

The braze joint can be made with the axis of the armature bar in either a horizontal or a vertical orientation. The vertical orientation is preferred because it aids alloy retention in the joint and permits pieces of the alloy to be more easily pre-placed on the surface of the assembly inside the hydraulic header clip, thereby providing a source of additional braze alloy and/or filler metal that will melt and flow over the bar 16 end surfaces to create a thicker layer of braze isolation layer.

Figure 6:
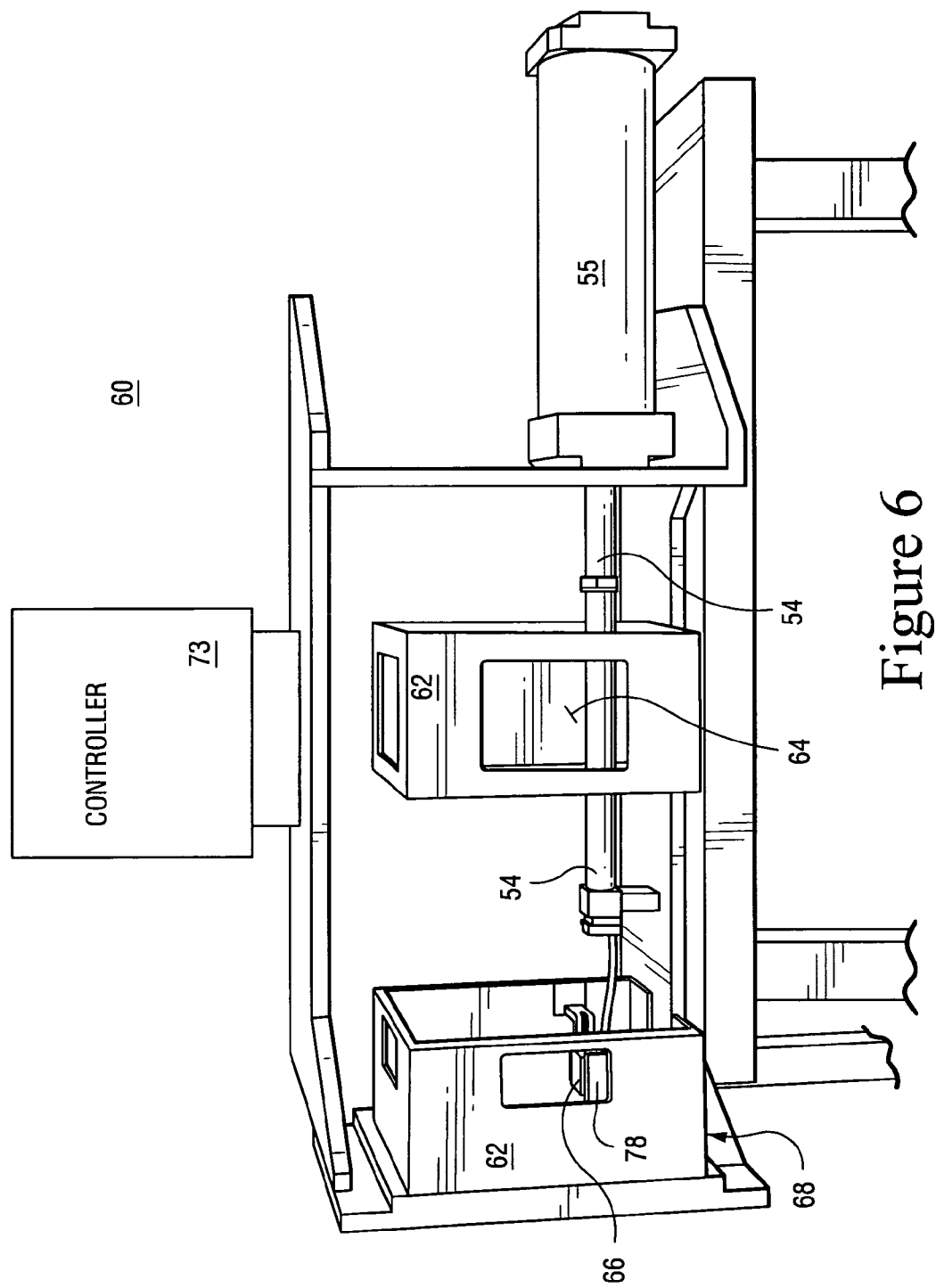
FIG. 6 is a perspective side view of a brazing chamber.

FIG. 6 is a side view of a brazing chamber 60 assembly. The braze chamber 60 is used to form a brazed connection of a liquid-cooled armature bar strand package to the hydraulic header clip 18 with a corrosion resistant braze alloy that is not susceptible to crevice corrosion initiation and provides for an alloy layer at the liquid-cooled interface surface of the brazement.

A split braze chamber has left and right side hood sections 62 that laterally separate to receive the armature winding bar. Once the bar 16 is mounted vertically in the left hood section, the right hood section closes against the left hood to form a closed chamber. Windows 64 in the hood sections allow the braze process to be viewed. The hood can withstand a brazing temperature of 1,000 degrees Celsius (1,832 degrees Fahrenheit) or more.

A controlled gas atmosphere is pumped into the chamber to purge oxygen and form an internal substantially oxygen free atmosphere within the chamber. The controlled gas atmosphere may comprise mixtures of nitrogen and hydrogen or 100 percent hydrogen. After purging, the oxygen level is preferably less than 500 parts per million (ppm) oxygen in the chamber. A substantially oxygen free atmosphere allows the brazing process to proceed without unwanted oxidation of the braze.

Figure 7:
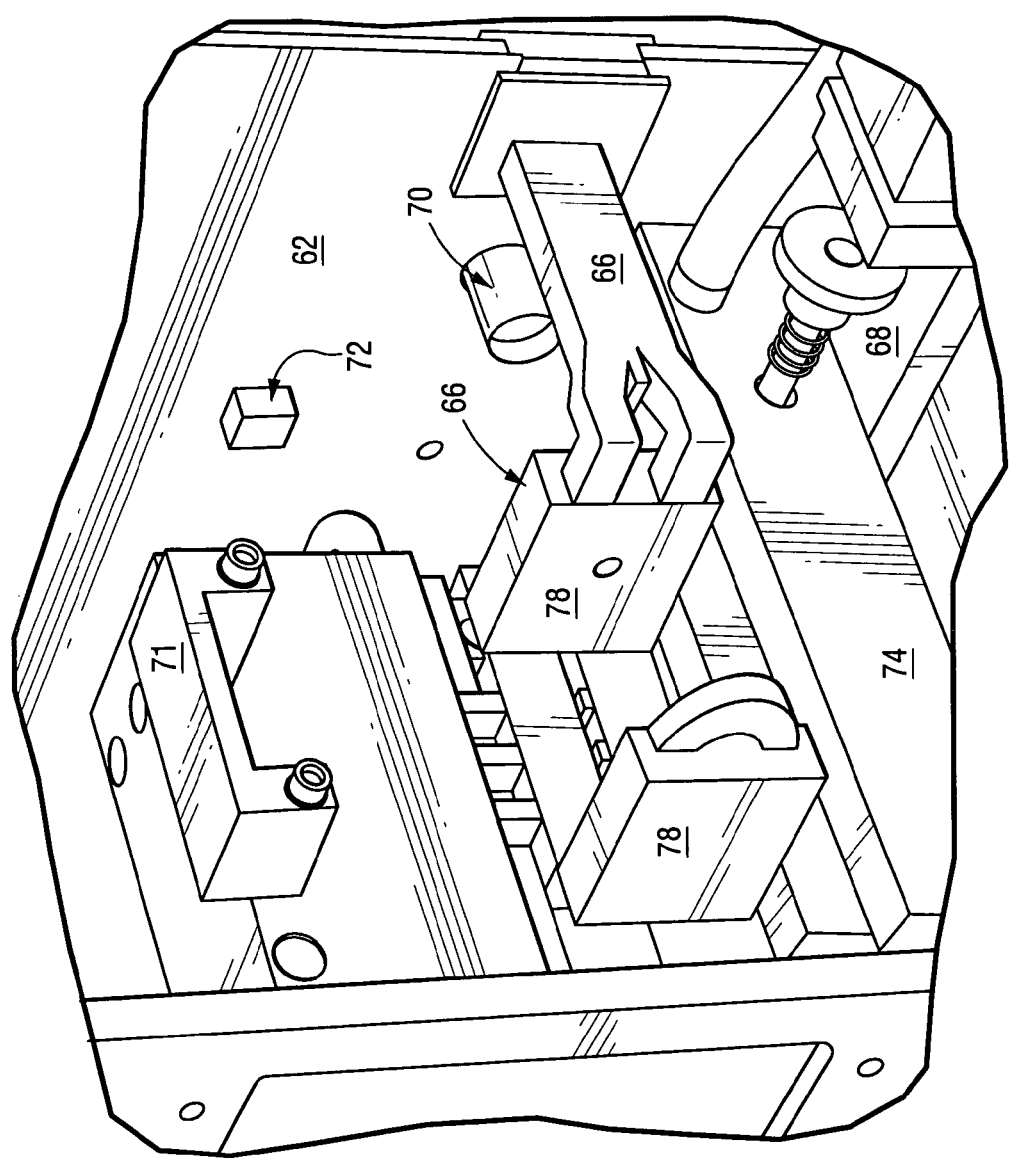
FIG. 7 is an enlarged view of the interior of the brazing chamber that shows an induction heating coil and armature winding bar heat sink.

FIG. 7 is a perspective view of the interior of the left hood 62 of the chamber 60, without an armature bar or clip seated in the coil 66. The induction heating coil 66 heats the clip and bar to a predetermined brazing temperature for a prescribed time period. The temperature profile of the heating coil is a design choice and depends on the brazing process being performed.

A hook-shaped (or U-shaped) induction heating coil 66 receives the bar end and hydraulic header clip 18. An upper guide 71 aligns the top of the hydraulic header clip such that the collar is between the legs 78 of the induction coil 66. A heat sink clamp 74 secures the armature bar vertically within the braze chamber and prevents liquid braze from flowing down between the strands of the bar. The ram 54 presses the clip cover 32 and strand ends 34, 36 into the clip during the braze process. A pneumatic drive cylinder 55 moves the ram and applies a compressive force to the clip cover.

The bottom wall 68 of the chamber includes a seal to receive the armature bar and prevent leakage of the gas atmosphere in the chamber. The inert gases in the chamber may be maintained at an above-atmospheric pressure to ensure that oxygen does not leak into the chamber.

Multiple temperature indicators 70 in the chamber and are located at various positions inside the brazing chamber. An oxygen sensor 72 within the chamber generates a signal in real time of the oxygen level in parts per million in the chamber atmosphere. The oxygen signal may be provided to a programmable logic controller 73 for the brazing process.

The programmable logic controller (PLC) 73 automates the braze process protocol. The PLC controls the induction coil and monitors the temperature and oxygen level in the chamber during the brazing process. The PLC may also control the force applied by the ram 54, 55 and the linear movement of the ram. The control program executed by the PLC may include multiple time and temperature cycles for heating the coil and the clip and armature bar assembly.

The heat sink 74 is a straight bar clamp that is spring loaded and grasps the bar 16 just below the clip. The heat sink is water cooled to ensure that the armature winding bar 16 below the clip is cooler than the liquidus temperature of the braze alloy. The cool armature bar at the clamp point causes liquid braze alloy flowing down between the bar strands to solidify.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to heat a metal assembly in a brazing chamber comprising:
    placing the assembly in the brazing chamber, wherein the assembly is seated in a heating coil;
    positioning a conductive mass between a press and the assembly;
    applying the press to the assembly while the assembly is seated in the coil;
    heating the assembly and the mass by applying energy to the coil;
    brazing the assembly with the heat from the coil, and
    removing the press and cooling the brazed assembly.

2. The method in claim 1 wherein heating coil includes a U-shaped section and the assembly seats in the U-shaped section.

3. The method in claim 2 wherein the conductive mass seats in the U-shaped section.

4. The method in claim 3 wherein the conductive mass substantially fills an area defined by an entrance to the U-shaped section.

5. The method in claim 1 further comprising heating the conductive mass with the coil and conducting heat from the coil to a location on the assembly in contact with the coil.

6. The method in claim 1 wherein the assembly includes a stator bar end and a clip, and the clip further includes a cover fitting into a slot in the clip, and the method further comprises abutting the conductive mass against the cover and conducting heat from the mass to the cover.

7. The method in claim 1 wherein the heating coil is an induction or resistive heating coil.

8. The method in claim 1 wherein the press is a ram and the ram abuts against the conductive mass.

9. The method in claim 8 wherein the conductive mass is attached to an extendible ram of the press and the mass is applied to the assembly.

10. The method in claim 1 wherein the heating coil is stationary and the assembly is moved into the seated position.

11. A method to heat a stator bar and clip assembly in a brazing chamber comprising:

placing the stator bar and clip assembly in the brazing chamber, wherein the assembly is seated in a U-shaped section of the heating coil and the assembly has an exposed surface distant from the coil;

extending a ram to press a heating mass against the exposed surface of the assembly, wherein the mass is adjacent the coil;

heating the assembly and heating mass by applying energy to the coil;

conducting heat through the heating mass to the exposed surface of the assembly;

brazing the stator bar to the clip with the heat from the coil, and removing the press and cooling the brazed clip.

12. The method of claim 11 wherein the clip includes a cover fitting into a slot in the clip and the method further comprises applying the press to the cover.

13. The method in claim 11 wherein heating coil is an induction or resistive heating coil.

14. The method in claim 11 wherein heating mass substantially fills a entrance to the U-shaped section.

15. The method in claim 11 wherein the ram extends longitudinally to press the heating mass against the exposed surface of the assembly.

* * * * *